(12) United States Patent
Baker et al.

(10) Patent No.: US 11,560,985 B2
(45) Date of Patent: Jan. 24, 2023

(54) LIGHTING ELEMENT

(71) Applicant: EMERGENCY TECHNOLOGY, INC., Hudsonville, MI (US)

(72) Inventors: Douglas V. Baker, Hudsonville, MI (US); George Hulse, Hudsonville, MI (US); Weston Harness, Hudsonville, MI (US); Brandon Jacobsen, Hudsonville, MI (US); Kyle Israels, Hudsonville, MI (US)

(73) Assignee: Emergency Technology, Inc., Hudsonville, MI (US)

( * ) Notice: Subject to any disclaimer, the term of this patent is extended or adjusted under 35 U.S.C. 154(b) by 0 days.

(21) Appl. No.: 17/181,631

(22) Filed: Feb. 22, 2021

(65) Prior Publication Data

US 2021/0172570 A1   Jun. 10, 2021

Related U.S. Application Data

(63) Continuation of application No. 16/485,662, filed as application No. PCT/US2018/018127 on Feb. 14, 2018, now Pat. No. 10,928,013.

(60) Provisional application No. 62/458,639, filed on Feb. 14, 2017.

(51) Int. Cl.
  *F21K 9/237* (2016.01)
  *F21S 41/141* (2018.01)
  *F21V 29/70* (2015.01)
  *B60Q 1/32* (2006.01)

(52) U.S. Cl.
  CPC ............... *F21K 9/237* (2016.08); *B60Q 1/32* (2013.01); *F21S 41/141* (2018.01); *F21V 29/70* (2015.01)

(58) Field of Classification Search
  None
  See application file for complete search history.

(56) References Cited

U.S. PATENT DOCUMENTS

| 5,632,551 A | 5/1997 | Roney et al. |
| 8,072,124 B2 | 12/2011 | Liu et al. |
| 2004/0213008 A1 | 10/2004 | Bayersdorfer et al. |
| 2009/0010026 A1 | 1/2009 | Gai |
| 2009/0064627 A1 | 3/2009 | Struthers et al. |
| 2010/0110660 A1 | 5/2010 | Brukilacchio |
| 2011/0317406 A1 | 12/2011 | Lin et al. |
| 2012/0051039 A1 | 3/2012 | Chang |

(Continued)

FOREIGN PATENT DOCUMENTS

| CN | 201706349 U | 1/2011 |
| CN | 201875486 U | 6/2011 |

(Continued)

OTHER PUBLICATIONS

International Search Report issued in related PCT patent application No. PCT/US2018/018127, dated May 30, 2018, 17 pages, Republic of Korea.‡

*Primary Examiner* — Ashok Patel
(74) *Attorney, Agent, or Firm* — McGarry Bair PC

(57) ABSTRACT

A lighting element includes a circuit board defining a longitudinal axis and including at least one illuminator thereon, a housing having at least one flexible element in the optical pathway of the at least one illuminator and in register with the at least one illuminator on the circuit board, and with opposing axial ends.

7 Claims, 13 Drawing Sheets

(56) References Cited

U.S. PATENT DOCUMENTS

| | | |
|---|---|---|
| 2013/0051062 A1 | 2/2013 | Lee et al. |
| 2014/0140074 A1 | 5/2014 | Chen et al. |
| 2015/0153032 A1 | 6/2015 | Tsai et al. |
| 2015/0267899 A1 | 9/2015 | Baright |
| 2018/0257542 A1 | 9/2018 | Baker et al. |

FOREIGN PATENT DOCUMENTS

| | | | |
|---|---|---|---|
| CN | 102788266 A | | 11/2012 |
| EP | 3356184 A1 | | 8/2018 |
| KR | 20110004594 A | | 1/2011 |
| KR | 200452760 Y1 | | 3/2011 |
| KR | 1020130039405 A | | 4/2013 |
| WO | 2010107913 | * | 9/2010 |
| WO | 2010110514 A1 | | 9/2010 |
| WO | 2012009921 A1 | | 1/2012 |

\* cited by examiner
‡ imported from a related application

LIGHTING ELEMENT

CROSS REFERENCE TO RELATED APPLICATIONS

The present application is a continuation of U.S. patent application Ser. No. 16/485,662, filed Aug. 13, 2019, now U.S. Pat. No. 10,928,013, which is a National Phase application of International Application No. PCT/US2018/018127, filed Feb. 14, 2018, which claims the benefit of U.S. Provisional Application Ser. No. 62/458,639 filed Feb. 14, 2017, all of which are incorporated herein by reference in their entirety.

BACKGROUND

This invention relates to lighting and illumination fixtures for, in one non-limiting example, a vehicle. In one of its aspects, the disclosure relates to a lighting fixture with multiple light-emitting diode (LED) light sources. In another of its aspects, the disclosure relates to a light assembly of one or more light sources and housing components.

BRIEF SUMMARY

In one aspect, the disclosure relates to a lighting element including a circuit board defining a longitudinal axis and including at least one illuminator, and a housing having a first flexible element and a second flexible element, the first flexible element positioned in an optical pathway of the at least one illuminator and the second flexible element aligned with a periphery of the circuit board, wherein at least one of the first flexible element and the second flexible element include opposing axial ends configured to match an axial end of an adjacent lighting element.

In another aspect, aspects of the disclosure relate to a lighting element including a circuit board defining a longitudinal axis and including at least one illuminator, a housing having an optical element having opposing axial ends, the optical element in register with the at least one illuminator on the circuit board, and the housing including a peripheral wall enveloping a periphery of the circuit board, the housing having at least one inwardly-extending leg having a retainer thereon, and a heat sink having at least one recess in alignment with the at least one inwardly-extending leg on the peripheral wall of the housing, wherein the inwardly-extending leg is positioned between opposing circuit board and heat sink portions, and wherein the opposing axial ends are configured to match an axial end of an adjacent lighting element.

DETAILED DESCRIPTION

Figure 1:
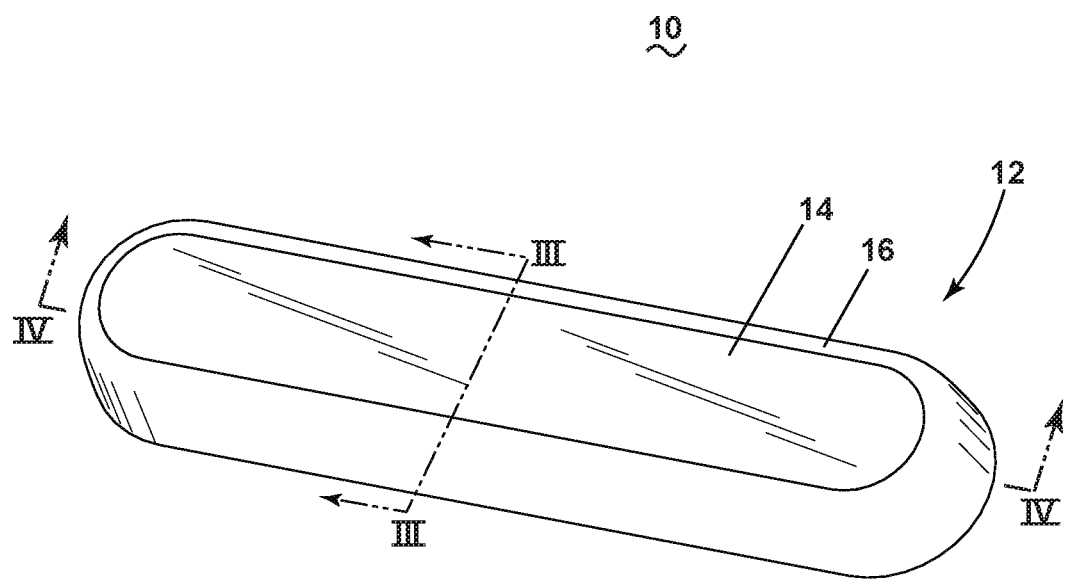
FIG. 1 illustrates a perspective view of a lighting element assembly in accordance with various aspects described herein.

Aspects of the disclosure can be implemented in any environment, apparatus, or method for illuminating or providing illumination. In one non-limiting example configuration, aspects of the disclosure can be included as lighting element or supplementary lighting element for a vehicle. For example, one non-limiting aspect of the disclosure can be utilized to provide active visual illumination, such as visual or lighting warnings, to attract the attention of motorists and pedestrians to the vehicle's presence or approach. While a "vehicle" is described, aspects of the disclosure can be applied to any vehicles, including, but not limited to, emergency vehicles (e.g. fire trucks, ambulances, law enforcement vehicles, or the like), construction vehicles (e.g. cars, trucks, construction equipment, bulldozers, cranes, or the like), land-based vehicles (pedestrian automobiles, motorbikes, all-terrain vehicles, or the like), sea-based vehicles (boats, barges, or the like), or air-based vehicles (aircraft, blimps, balloons, or the like). Non-limiting examples of vehicles can include, for instance, cars, trucks, semi-trucks, cargo carriers, boats, aircraft, and trains. Furthermore, as used herein, a vehicle does not need to include an independent propulsion system, and can include, for example, train cars, barges, trailers, or semi-trailers. In addition to vehicles, non-limiting aspects of the disclosure can also be included in stationary illumination applications, such as signage, security lighting, or the like.

While "a set of" various elements will be described, it will be understood that "a set" can include any number of the respective elements, including only one element. As used herein, the terms "axial" or "axially" refer to a dimension along a longitudinal axis described. The terms "fore" or "forward" refers to a vector in the direction of illumination of a lighting element, while the terms "aft," "backward," or "rear" used in refers to a direction opposite to the vector in the direction of illumination of the lighting element, or toward the rear lighting element.

As used herein, the terms "radial" or "radially" refer to a dimension extending between a center longitudinal axis described, an outer circumference, or a circular or annular component described.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

FIG. 1 illustrates a lighting element assembly 10 in accordance with various aspects described herein. Non-limiting aspects of the disclosure can be included wherein the lighting element assembly 10 is a primary lighting element or a supplemental lighting element, for instance, for a vehicle or another device as described above. As used herein, a "primary" lighting element can include a primary illuminator, such as room lighting, or automobile headlamps, while a "supplementary" lighting element can include non-primary illuminators, including, but not limited to, accessory lighting, light bars (e.g. for emergency or non-emergency vehicles), warning lighting, perimeter lighting, notification lighting, or the like.

The lighting element assembly 10 can include at least one optical element 12, illustrated as a first optical element 14 and a second optical element 16. Non-limiting aspects of the disclosure can be included wherein the first and second optical elements 14, 16 can be formed or molded as a single, continuous optical element 12, or can be separately formed as distinct optical elements 14, 16 and adjoined, assembled, coupled, attached, fixed, or the like. As shown, the at least one optical element 12 can include a top portion (for example, the first optical element 14 portion) having a substantially ovate, planar surface. Also, as shown, the at least one optical element 12 can include a side portion (for example, the second optical element 16) having a peripheral wall encircling the top portion while the contours transition from the substantially planar surface of the top portion to a sidewall surface that is substantially perpendicular to the top planar surface. Not limiting dimensional aspects of the lighting element assembly 10 can include an assembly that is less than or equal to 10 millimeters tall (e.g. 9 millimeters, or as measured from the base of the peripheral wall to the top planar surface), between, or less than, 76.2 millimeters to 101.6 millimeters along a major body axis of the assembly 10, and less than or equal to 25.4 millimeters wide along a minor body axis of the assembly 10. In one non-limiting aspect of the disclosure, the length along the major body axis of the assembly can be approximately 161.7 millimeters.

In another non-limiting aspect of the disclosure, at least one of the first or second optical elements 14, 16 can be adjoined, or the like, during the forming process. For example, the first optical element 14 can be formed, molded, manufactured, or the like, and can then be adjoined, or the like, during the forming, molding, manufacturing, or the like, of the second optical element 16. Non-limiting aspects of the disclosure can also be included wherein the compositions, colors, additives, tintings, attenuation, dopings, or physical properties or characteristics can be the same or dissimilar between the first and second optical elements 14, 16. In yet another non-limiting aspect of the disclosure, at least one of the first or second optical elements 14, 16 can be formed or molded from a flexible, optical-grade silicon material. While a flexible silicon material is described, any silicon or silicone material can be included when describing the flexible silicon material or element, including but not limited to, a silicone polymer material.

Figure 2:
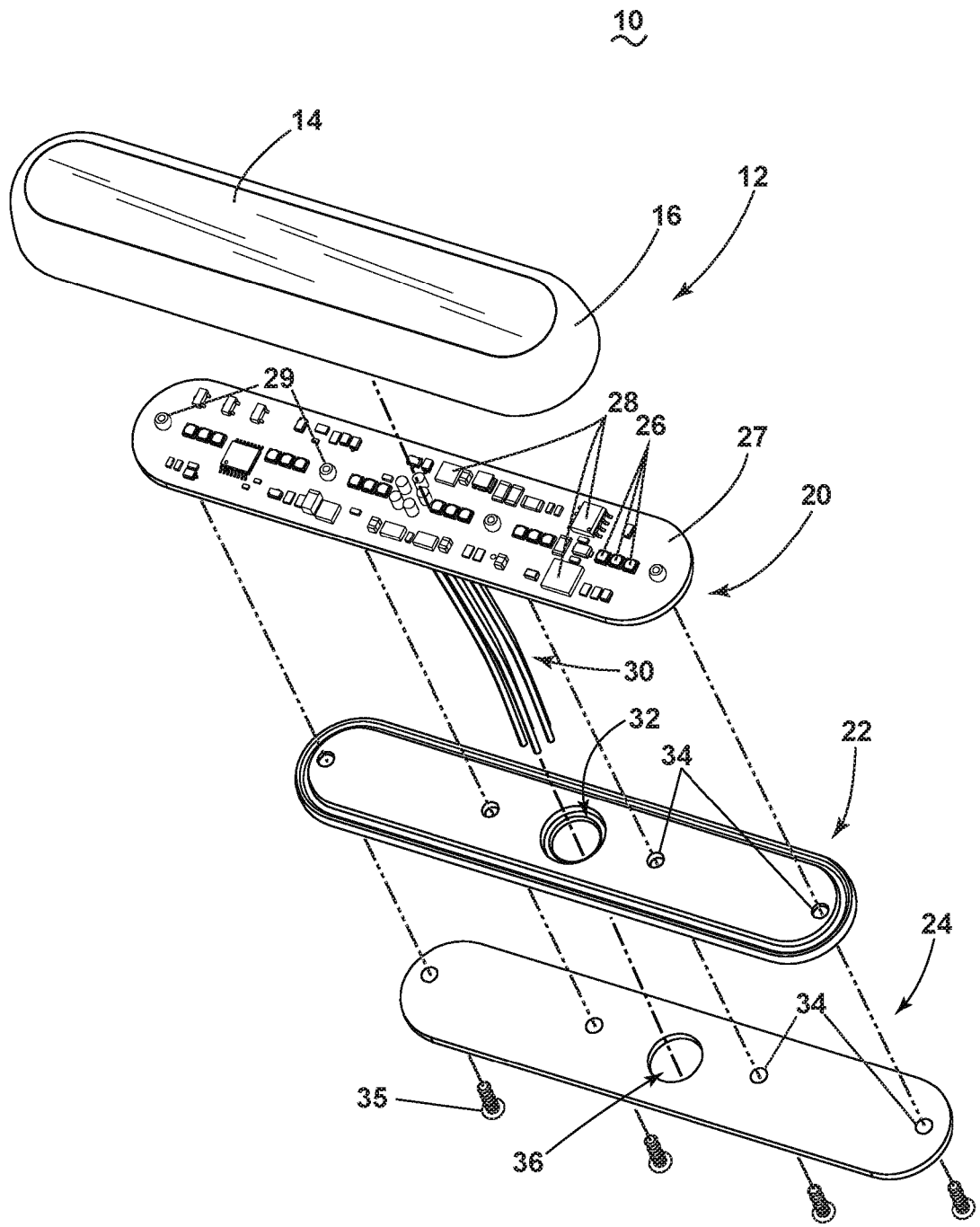
FIG. 2 illustrates an exploded perspective view of the lighting element assembly of FIG. 1, in accordance with various aspects described herein.

FIG. 2 illustrates an exploded view of the lighting element assembly 10. As shown, the lighting element assembly can further include an electronics board portion 20, a thermally conductive heat sink portion 22, and an optional adhesive pad 24. In this sense, the heat sink portion 22 is positioned between the electronics board portion 20 and the optional adhesive pad 24. The electronics board portion 20 can further include, but is not limited to a circuit board 27, such as a printed circuit board (PCB), supporting at least one illuminator and supporting circuitry 28. In the non-limiting illustrated example, the at least one illuminator can include a set of light-emitting diodes (LEDs) 26, and the supporting circuitry 28 can include controller modules configured to operate the set of LEDs 26, power electronics for converting, regulating, or supplying appropriate power levels and patterns to the LEDs 26, and the like. As shown, non-limiting aspects of the disclosure can be included wherein the entire set of the LEDs 26, or a subset thereof, are positioned or located along a common axis, a common plane, or a common two-dimensional array. Non-limiting aspects of the electronics board portion 20 or the circuit board 27 can be include wherein the electronics board portion 20, the circuit board 27, or a substrate thereof can be rigid or flexible.

Non-limiting aspects of the circuit board 27 can also include a set of mountings 29 configured to receive a corresponding or matching set of fasteners. Non-limiting examples of fasteners can include mechanical fasteners, screws, nails, rivets, or the like, to enable or provide for physical attachment or coupling of the electronics board portion 20 or the lighting element assembly 10 to a mounting surface, such as the surface of a vehicle (not shown). In another non-limiting example, the mechanical fasteners can enable or provide for physical attachment or coupling of the electronics board portion 20 to the heat sink portion 22. In yet another non-limiting example, a set of more than one mechanical fasteners can be utilized, wherein, for example, a first mechanical fastener enables or provides for physical attachment or coupling of the electronics board portion 20 to the heat sink portion 22, while a second mechanical fastener is utilized to mount the lighting element assembly 10 to a mounting surface. In the aforementioned example, the first and second mechanical fasteners can be different fasteners (e.g. a rivet and a screw). For ease of understanding, the fastener has been generically illustrated as a set of screws 35.

The electronics board portion 20 can also include a set of electrical connectors, shown as conductive wires 30, for electrically coupling at least one of the circuit board 27, the supporting circuitry 28, or the LEDs 26 to a power source or a controller module configured to operate the like. While a set of conductive wires 30 are illustrated, non-limiting aspects of the disclosure can be included wherein as few as two conductive wires 30 are included (e.g. power and ground), or, for example, three conductive wires 30 are included (e.g. power, ground, common control signal configured or generated for controlling the set of LEDs 26). In yet another non-limiting aspect of the disclosure, the conductive wires 30 can connect by way of a physical locking connector that includes that conductive connection between the electronics board portion 20 and the power source or controller module.

Non-limiting aspects of the heat sink portion 22 can include a thermally conductive material, such as a metal, metal alloy, or the like, selected for thermally conductive properties. In another non-limiting aspect, the heat sink portion 22 can be rigid or flexible. During illumination operations, the LEDs 26 can generate an amount of heat that can be thermally conducted, for instance, via the circuit board 27, to the heat sink portion 22. Non-limiting configurations of the heat sink portion 22 can also include a first aperture or opening 32 sized, shaped, contoured, keyed, or the like, to receive or enable the set of conductive wires 30 to pass through the first opening 32. For example, while a circular opening 32 is shown, the opening 32 can include any shaping, sizing, or the like, including but not limited to a square opening. In another non-limiting configuration of the heat sink portion 22, a set of second openings 34 can be provided that are sized, shaped, contoured, keyed, or the like, to receive or enable the set or a subset of the screws 35 to pass through.

As shown, the optional adhesive pad 24 can include a corresponding set of second openings 34, aligned with the openings 34 of the heat sink portion 22 for receiving or enabling the set or a subset of the screws 35, as described. Non-limiting configurations of the optional adhesive pad 24 can also include a third aperture or opening 36 sized, shaped, contoured, keyed, or the like, to receive or enable the set of conductive wires 30 to pass through the third opening 36. Aspects of the disclosure are envisioned wherein the set of openings 34 are aligned or arranged based on the aforementioned mechanical fastener configurations or locations.

Figure 3:
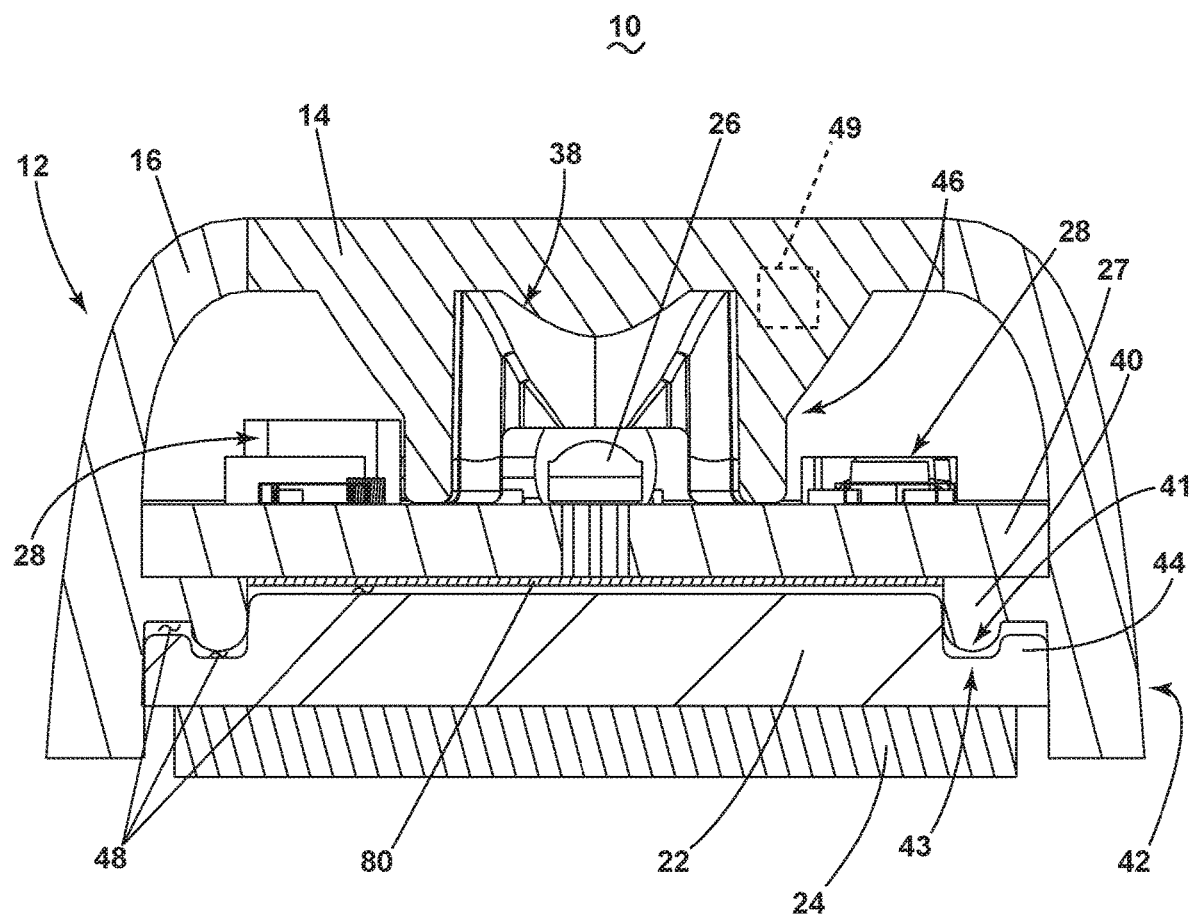
FIG. 3 illustrates a cross-sectional view of the lighting element assembly, taken along line of FIG. 1, in accordance with various aspects described herein.

FIG. 3 illustrates a cross-sectional view of the lighting element assembly 10 taken along line of FIG. 1 (i.e. along the minor body axis of the lighting element assembly 10). As shown, the optical element 12 or the first optical element 14 is positioned above the LED 26 such that the optical pathway of light emitted from the LED 26 is directed through the top substantially planar surface of the optical element 12 or the first optical element 14. In this sense, the optical element 12 or the first optical element 14 is in register with the LED 26. As shown, non-limiting configurations of the optical element 12 or the first optical element 14 can further include shaping 38, contours, angling, or the like configured to enable the focusing of light emitted from the LED 26 to concentrate, reach, or the like a predetermined target or predetermined pattern. The optical element 12 or the first optical element 14 can also include a set of first legs 46 configured to define, structurally space, or resiliently enable or maintain a predefined focal spacing between the LED 26 and at least one of the optical element 12, the first optical element 14, or the shaping 38. In a further non-limiting aspect, the arrangement of LEDs 26 with shaping 38 is especially favorable when the materials for optical element 12 are physically non-rigid or flexible. For example, aspects of the disclosure can be included wherein the first legs 46 provide for, enable, or maintain self-alignment, registration, physical supportive means, or a combination thereof between the circuit board 27 and the shaping 38 or optical element 12.

As shown, the lighting element assembly 10 can further include a thermally conductive and electrically insulative portion such as a thermal pad 80, positioned between the circuit board 27 and the heat sink portion 22 to electrically insulate the circuit board 27 from the heat sink portion 22. Non-limiting aspects of the thermal pad 80 can include a pre-formed solid or flexible material, such as silicon, configured to aid or enable the conduction of heat away from the electronics board portion 20. In another non-limiting aspect, the thermal pad 80 can be an incompressible element or material. In this sense, heat generated by the LEDs 26 can be thermally conducted via the circuit board 27, through the thermal pad 80, to the heat sink portion 22.

In another non-limiting aspect of the disclosure, the optical element 12 or the second optical element 16 can define a peripheral wall 42, as described herein. As shown, at least a portion of the peripheral wall 42 can extend rearwardly past at least one of the circuit board 27 or the heat sink portion 22. Non-limiting aspects of the disclosure can be included wherein the at least a portion of the peripheral wall 42 can further extend rearwardly past at least a portion of the optional adhesive pad 24. In this sense, the circumference of the peripheral wall 42 envelops a periphery of the circuit board 27, and defines at least a portion of a housing (including the optical element 12, the first optical element 14, or the second optical element 16) for the lighting element assembly 10.

The optical element 12 or the second optical element 16 can also include at least one second inwardly-extending leg 40 having a retainer 41. The heat sink portion 22 can further include at least one third outwardly-extending circumferential leg 44 having a recess 43 sized, shaped, contoured, keyed, or the like to mate, match, or otherwise interact with the retainer 41 of the second leg 40. In this sense, the retainer 41 and the recess 43 are configured, sized, shaped, or the like, to be in alignment with, or to be received within each other when the lighting element assembly 10 is assembled. While FIG. 3 illustrates only a single cross-sectional view, non-limiting aspects of the disclosure can be included wherein the retainer 41 or the second leg 40 extends along the entire inner surface of the entire peripheral wall 42, or a set of portions thereof. Likewise, non-limiting aspects of the disclosure can be included wherein the recess 43 or the third leg 44 extends along the entire periphery of the heat sink portion 22, or for example, along a corresponding or matching set of periphery portions aligned with the retainer 41.

As shown, at least one of the optical element 12, the second optical element 16, or the heat sink portion 22 can be sized such that a set of gaps 48 can be formed between the heat sink portion 22 and the circuit board 27, or between at least an aligned portion of the second leg 40 and third leg 44, when the optical element 12 or the second optical element 16 is placed around the circuit board 27. While a gap 48 is illustrated between the thermal pad 80 and the heat sink portion 22, aspects of the disclosure can be included wherein the gap 48 can exist between the circuit board 27 and the thermal pad 80 (e.g. the thermal pad 80 is coupled with the heat sink portion 22 instead of the circuit board 27), or gaps 48 can exist both above and below the thermal pad 80.

Non-limiting aspects of the disclosure can also be included wherein at least one of the optical element 12, the first optical element 14, or the second optical element 16 can include an additive (schematically illustrated as dotted box 49). Non-limiting example additives 49 can include compositions, coloring elements, visible or non-visible spectrum light attenuation or attenuating elements, tinting elements, doping elements, or illuminative enhancement elements, such as a phosphoric element. The additive 49 can be evenly dispersed or selectively positioned or located on or within the optical element 12. As described herein, aspects of the disclosure can be included wherein the first optical element 14 and the second optical element 16 can include dissimilar additives 49. For instance, in one non-limiting configuration, the optical element 12 or the first optical element 14 can include no additives 49, or additives 49 selected or configured to enable transparency or a predetermined amount of translucency. In this sense, the optical element 12 or the first optical element 14 can be configured to allow a significant portion of illumination from the LED 26 to traverse through the optic.

In another non-limiting configuration, the optical element 12 or the second optical element 16 can include additives 49 selected or configured to enable transparency, a predetermined amount of translucency, a predetermined amount of opacity, or coloring of the optic. For example, the optical element 12 or the second optical element 16 can be configured to be at least partially opaque and to be color-matched to correspond with a mounting surface, such as a wall or body of a vehicle. In this sense, the optical element 12, the first optical element 14, or the second optical element 16 can be configured or selected such that the additives 49 enable a "blending in" or a "concealing" quality of the light element assembly 10 relative to the mounting surface. Stated another way, the light element assembly 10 can be selectively configured to reduce the visibility of the light element assembly 10 relative to the mounting surface or vehicle. In on non-limiting example, a reduced visibility light element assembly 10 can improve the concealment of a law enforcement vehicle.

Figure 4:
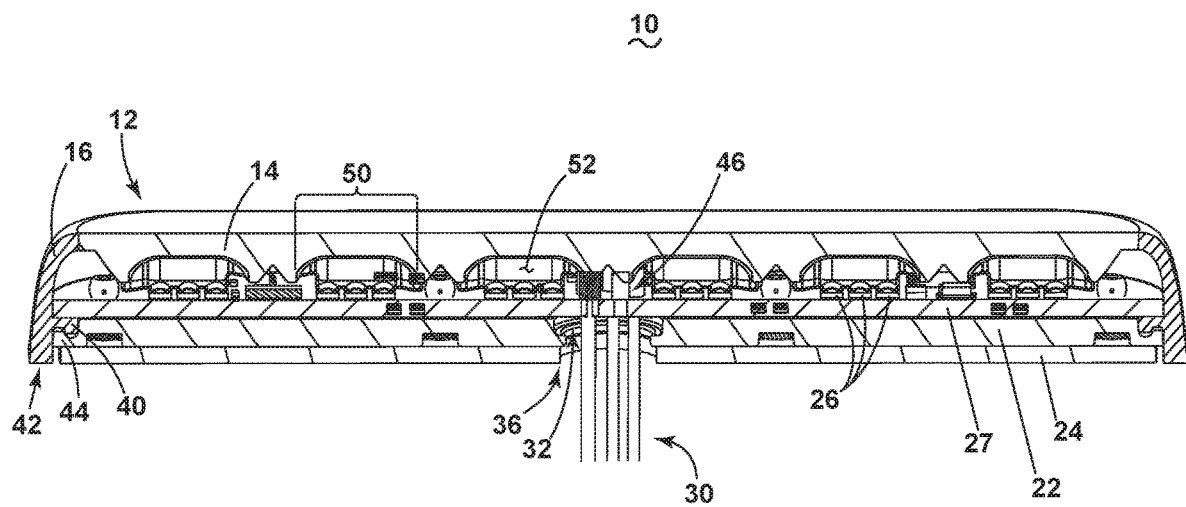
FIG. 4 illustrates a cross-sectional view of the lighting element assembly, taken along line IV-IV of FIG. 1, in accordance with various aspects described herein.

FIG. 4 illustrates a cross-sectional view of the lighting element assembly 10 taken along line IV-IV of FIG. 1 (i.e. along the major body axis of the lighting element assembly 10). As shown, non-limiting aspects of the disclosure can include the circuit board 27 having a plurality of grouped LED 26 sets, such as a plurality of 3 LEDs per grouping. Each of the plurality of grouped LED 26 sets can be aligned with a corresponding depending partial conical portion, or bulbous portion 50, of the optical element 12 or the first optical element 14. In this sense, the bulbous portion 50 defines a cavity 52 containing a set of the grouped LEDs 26.

Figure 5:
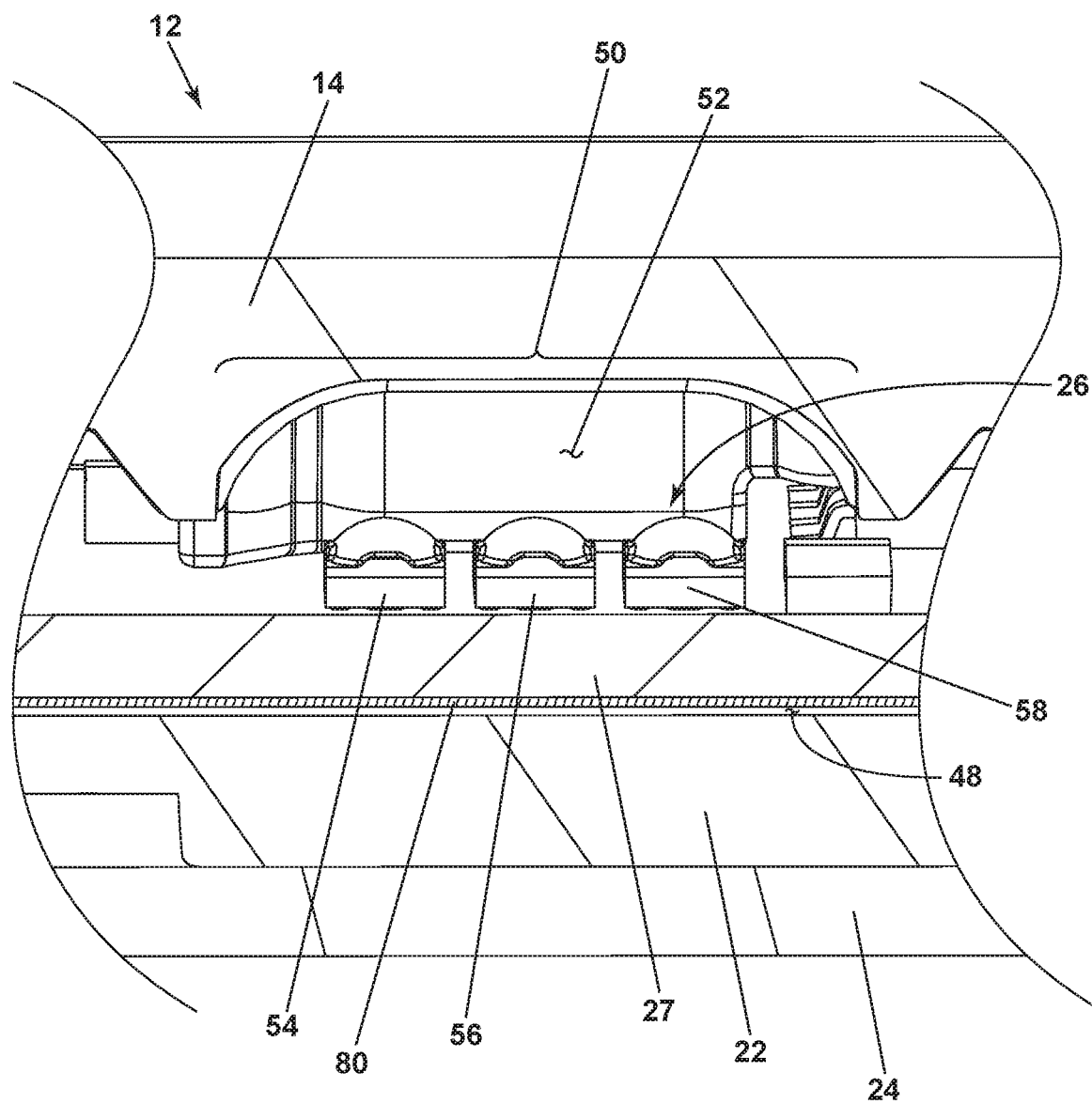
FIG. 5 illustrates a zoomed cross-sectional view of the lighting element assembly, in accordance with various aspects described herein.

FIG. 5 illustrates a zoomed cross-sectional view of a grouping of LEDs 26 of FIG. 4. Non-limiting aspects of the disclosure can be included wherein each LED 26 in a grouping of LEDs 26 are the same, or emit a substantially similar colored light or illumination. Additional non-limiting aspects of the disclosure can be included wherein at least a subset of the LEDs 26 in a grouping emits different colored light or illumination. For example, the grouping of LEDs can include a first LED 54, a second LED 56, and a third LED 58. In a non-limiting first aspect, all the LEDs 54, 56, 58 can emit white light. In a non-limiting second aspect, all LEDs 54, 56, 58 can emit red light. In a non-limiting third aspect, the first LED 54 can emit a first color, such as red, while at least one of the second or third LEDs 56, 58 can emit a second color, such as white. In yet another non-limiting fourth aspect, the first LED 54 can emit a first color, such as red, the second LED 56 can emit a second color, such as white, and the third LED 58 can emit a third color, such as blue.

While only a single set of grouped LEDs 26 is illustrated, non-limiting aspects of the disclosure can be included wherein the same LEDs 26 (i.e. same colors of LEDs 26, or grouping of similarly-colored LEDs 26) of each grouping are controllably illuminated at the same time. For instance, all red LEDs 26 can be configured to operate simultaneously under a first control condition such that the lighting element assembly 10 only produces red light. In another example configuration, a first set of LEDs 26 can be configured to operate in an alternating flashing pattern with a second set of LEDs 26 to, for instance, flash red and white light from the lighting element assembly 10.

Figure 6:
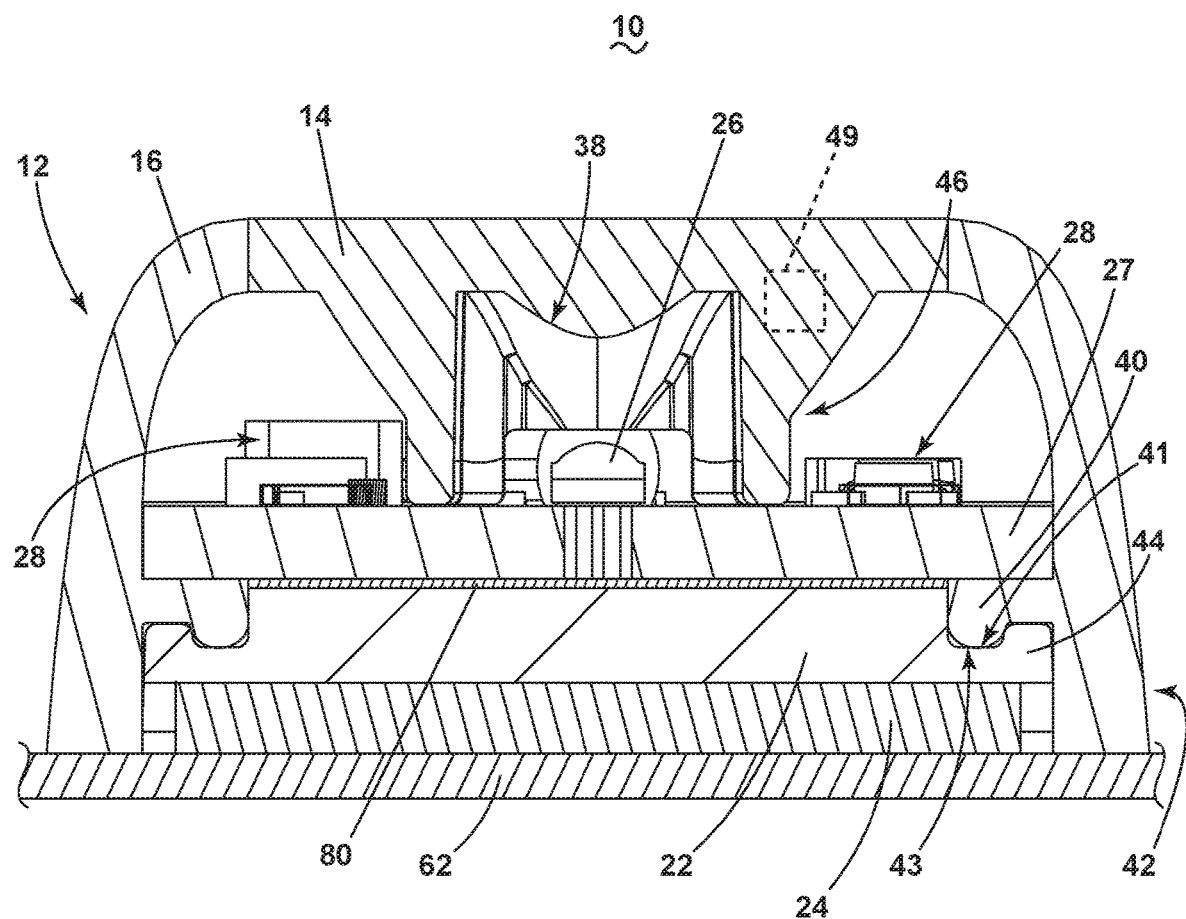
FIG. 6 illustrates a cross-sectional view of a lighting element assembly mounted to a mounting surface, in accordance with various aspects described herein.

FIG. 6 illustrates a cross-sectional view of the lighting element assembly 10 similar to FIG. 3, therefore like parts are identified with like numerals. A difference between FIG. 3 and FIG. 6 is that FIG. 6 illustrates a view wherein the lighting element assembly 10 has been fastened, coupled, or attached to a mounting surface 62, such as a vehicle. In one non-limiting aspects of the disclosure, a fastener (not shown) can be utilized to restrain, bias, fix, or compress the circuit board 27 toward the mounting surface 62. As a result of the compressive force of the circuit board 27 toward the mounting surface 62, the peripheral wall 42 of the optical element 12 or the second optical element 16 is compressed toward the mounting surface 62. Since the peripheral wall 42 is a flexible material, the compressive force of the peripheral wall 42 toward the mounting surface 62 can form a weather-tight seal, preventing moisture, debris, and the like from accessing the interior of the lighting element assembly 10. In another non-limiting configuration of the disclosure, the compressive force between the circuit board 27 toward the mounting surface 62 can be provided or enabled by way of the optional adhesive pad 24. In this configuration, for example, the mechanical fasteners can connect the heat sink portion 22 with the circuit board 27, as described herein.

In another non-limiting aspects of the disclosure, the compressive force of the circuit board 27 toward the mounting surface 62, the peripheral wall 42 of the optical element 12 or the second optical element 16 is compressed toward the mounting surface 62 can effectively or operably close or eliminate the gap 48 (i.e. as shown and described with respect to FIG. 3) between the heat sink portion 22, the thermal pad 80, and the circuit board 27. In another non-limiting configuration of the disclosure, the compressive force between the circuit board 27 toward the mounting surface 62 can be provided or enabled by way of the optional adhesive pad 24.

In yet another non-limiting aspect of the disclosure, the compressive force (via compression toward the mounting surface 62, or via compression of the circuit board 27 and the heat sink portion 22) can effectively or operably close or eliminate the gap 48 between at least an aligned portion of the second leg 40 and third leg 44. In yet another non-limiting aspect of the disclosure, the compressive force can effectively or operably close or eliminate all of the gaps 48 described herein. Since at least the second leg 40 can be a flexible material, the compressive force toward the mounting surface 62, or between the circuit board 27 and the heat sink portion 22, can form a weather-tight seal, preventing moisture, debris, and the like from accessing the interior of the lighting element assembly 10. At least one of the compressive seal between the mounting surface 62 and the peripheral wall 42, between the heat sink portion 22 and the circuit board 27, or between at least an aligned portion of the second leg 40 and third leg 44 can prevent access to the circuit board 27.

Figure 7:
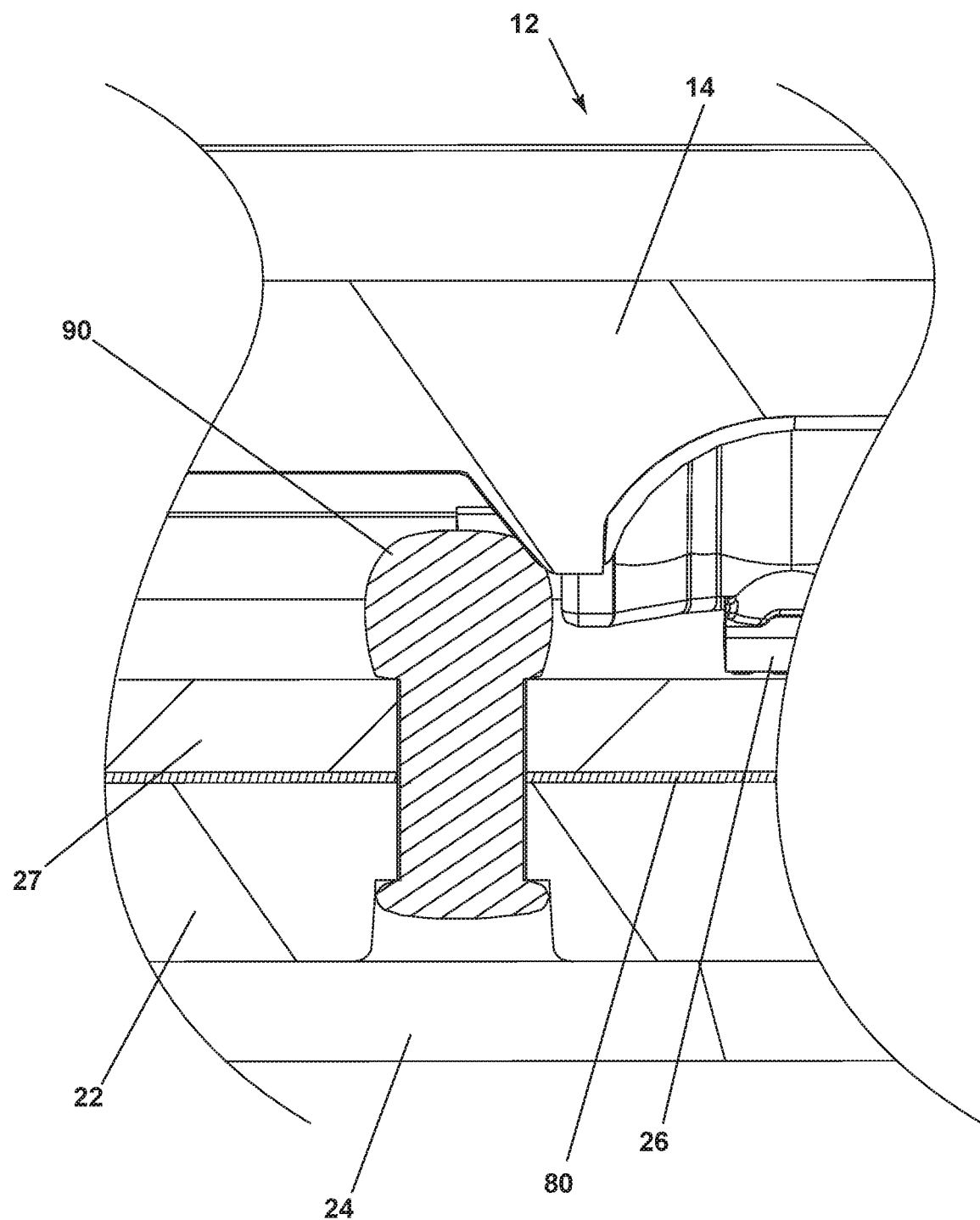
FIG. 7 illustrates a zoomed cross-sectional view of the lighting element assembly fixed by way of a rivet, in accordance with various aspects described herein.

FIG. 7 illustrates a non-limiting zoomed cross-sectional view of the lighting element assembly 10, wherein the circuit board 27 is fixed or fastened relative to the heat sink portion 22 by way of a mechanical fastener, illustrated as a rivet 90. As shown, the fastening or fixing of the circuit board 27 relative to the heat sink portion 22 can provide the compressive force described herein to close the gap 48 between the circuit board 27, the heat sink portion 22, the thermal pad 80, or a combination thereof.

Figure 8:
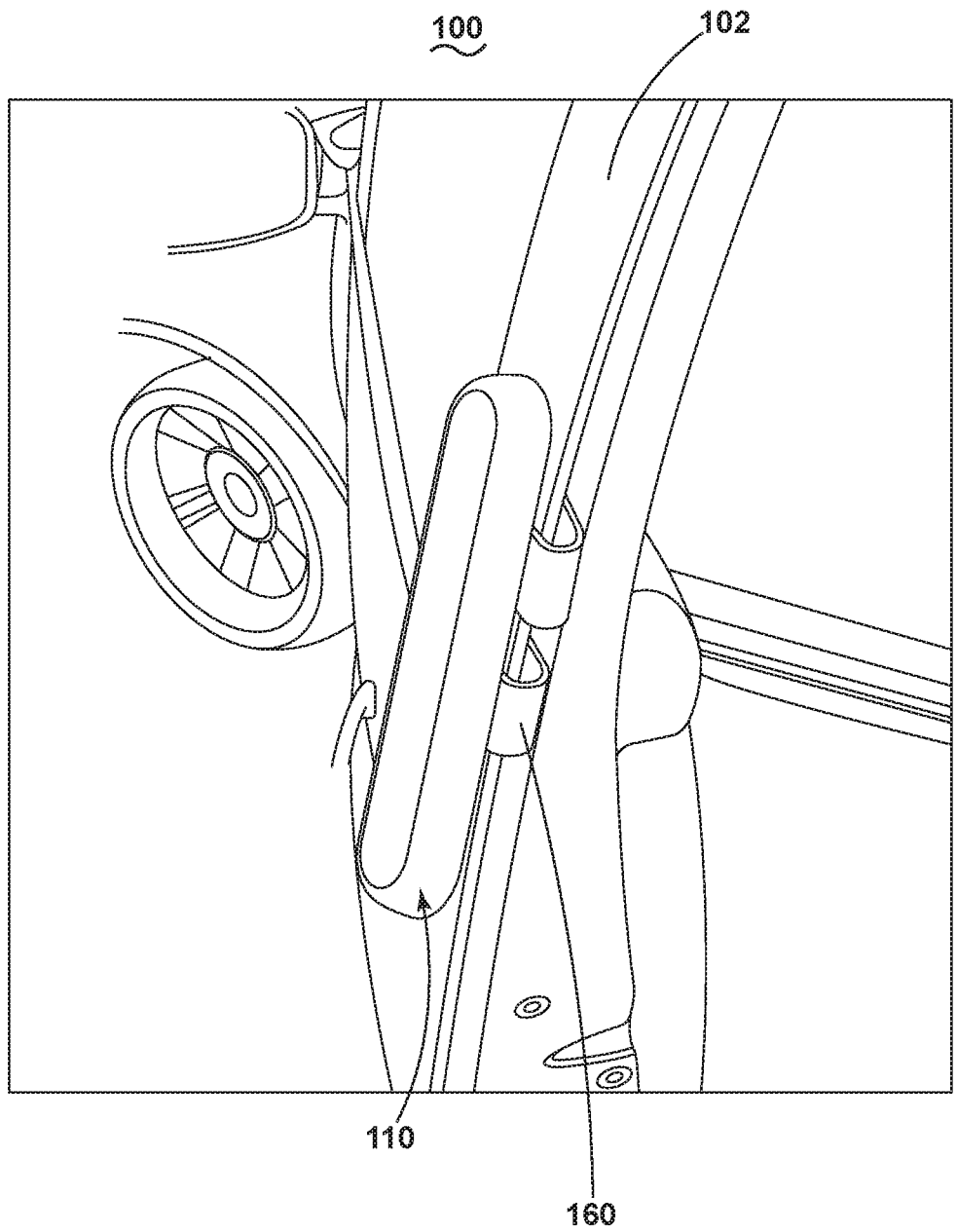
FIG. 8 illustrates a perspective view of the lighting element assembly attached to a first vehicle surface, in accordance with various aspects described herein.

FIG. 8 illustrates another non-limiting aspect of the disclosure wherein a lighting element assembly 110 can be fastened to a vehicle 100 surface, such as a car side wall or door 102, by way of another fastener, such as a clip mount 160. As shown, the clip mount can provide the aforementioned compressive force to form the compressive seals described herein.

Figure 9:
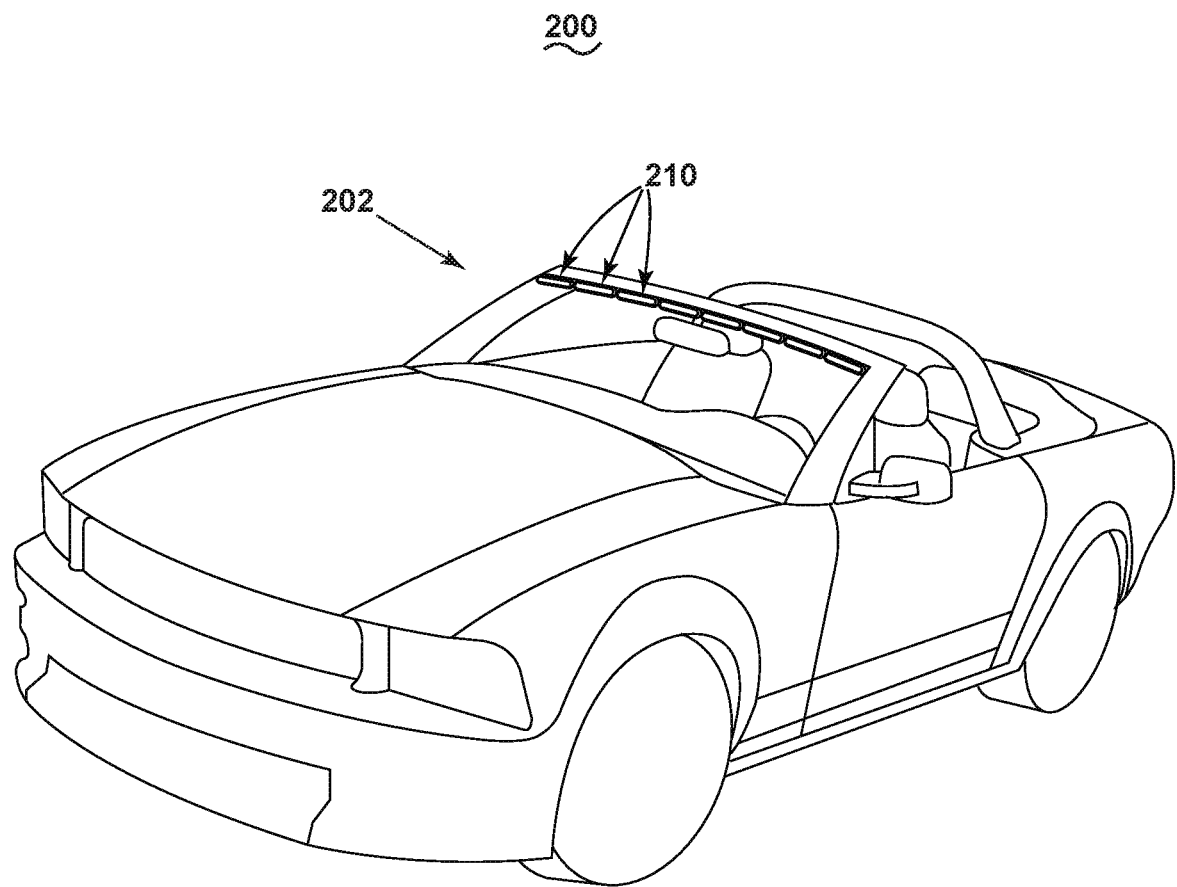
FIG. 9 illustrates a perspective view of the lighting element assembly attached to a second vehicle surface, in accordance with various aspects described herein.

FIG. 9 illustrates another non-limiting aspect of the disclosure, wherein a set of lighting element assemblies 210 can be fastened to a vehicle 200 surface, such as along a windshield 202, or along a predefined mounting line of the vehicle 200, to define a lighting assembly, such as a light bar.

Figure 10:
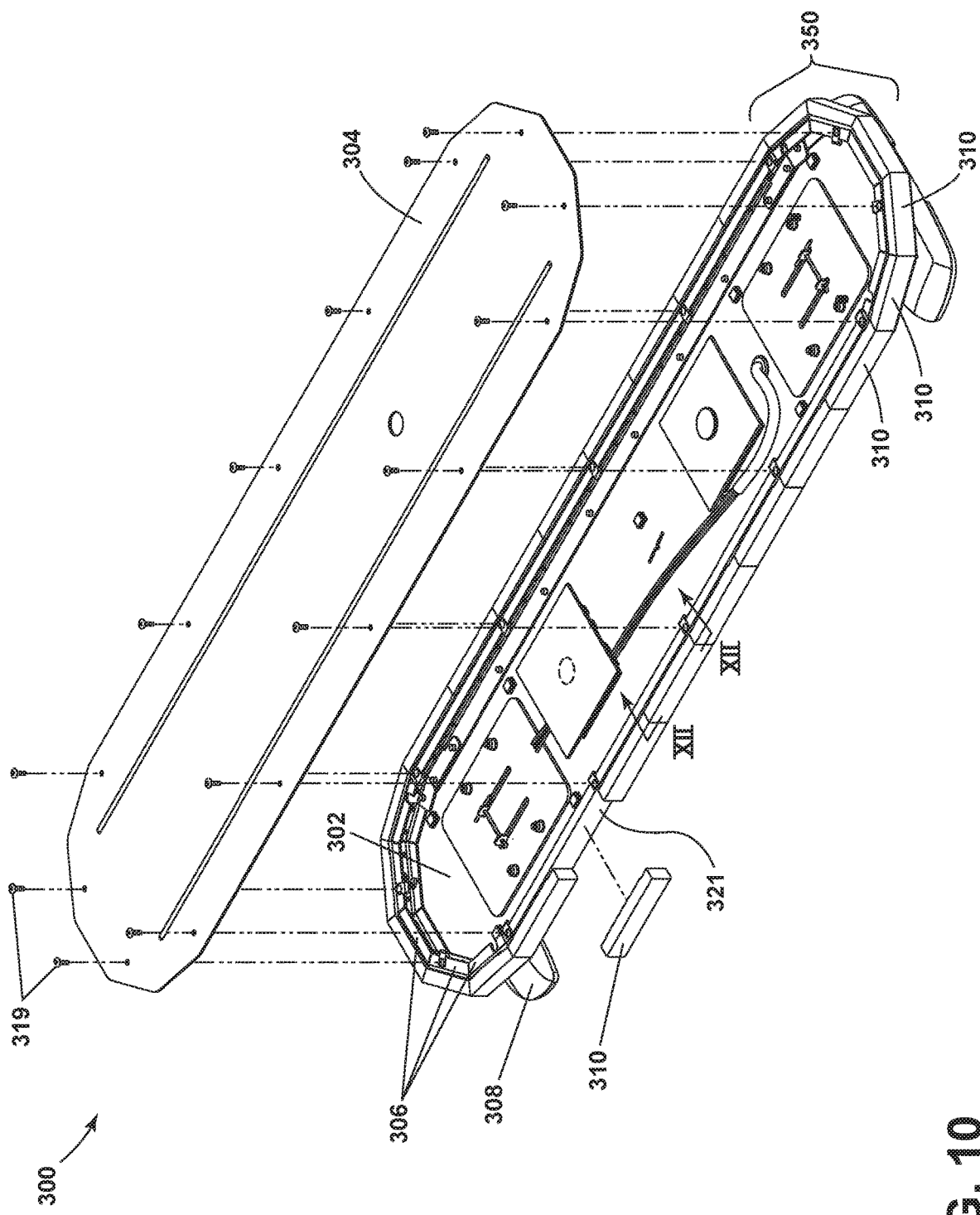
FIG. 10 illustrates an exploded perspective view of a primary vehicle lighting element including a set of supplemental lighting elements, in accordance with various aspects described herein.

FIG. 10 illustrates an exploded perspective view of a primary vehicle lighting element 300, such as a lightbar for a vehicle. The vehicle lighting element 300 includes a frame 302 that supports multiple, or a set of, supplemental lighting elements 310, such as, or similar to, the lighting element assembly 10, 110, 210 described herein. A complementary upper member 304 can couple with the frame 302 via fasteners 319. The fasteners 319 can be any suitable fastener, such as screws and the like. Feet 308 can be provided on the frame 302 in order to mount the vehicle lighting element 300 to at least a portion of a vehicle.

The frame 302 can include a set of outwardly faceted surfaces 306 that define an exterior surface 306 of the frame 302. In one non-limiting example, the outwardly faceted surfaces 306 can be arranged to face outwardly in a direction parallel with the upper member 304. The set of supplemental lighting elements 310 can be in contact with the exterior surface 306, or mounting surface 321, and can be in alignment such that adjacent supplemental lighting elements 310 form a continuous outwardly-facing exterior surface 350 of the supplemental lighting elements 310. The continuous exterior surface 350 can extend around the entire perimeter of the frame 302 and can form a seal around the exterior surface 306 of the frame 302.

Figure 11:
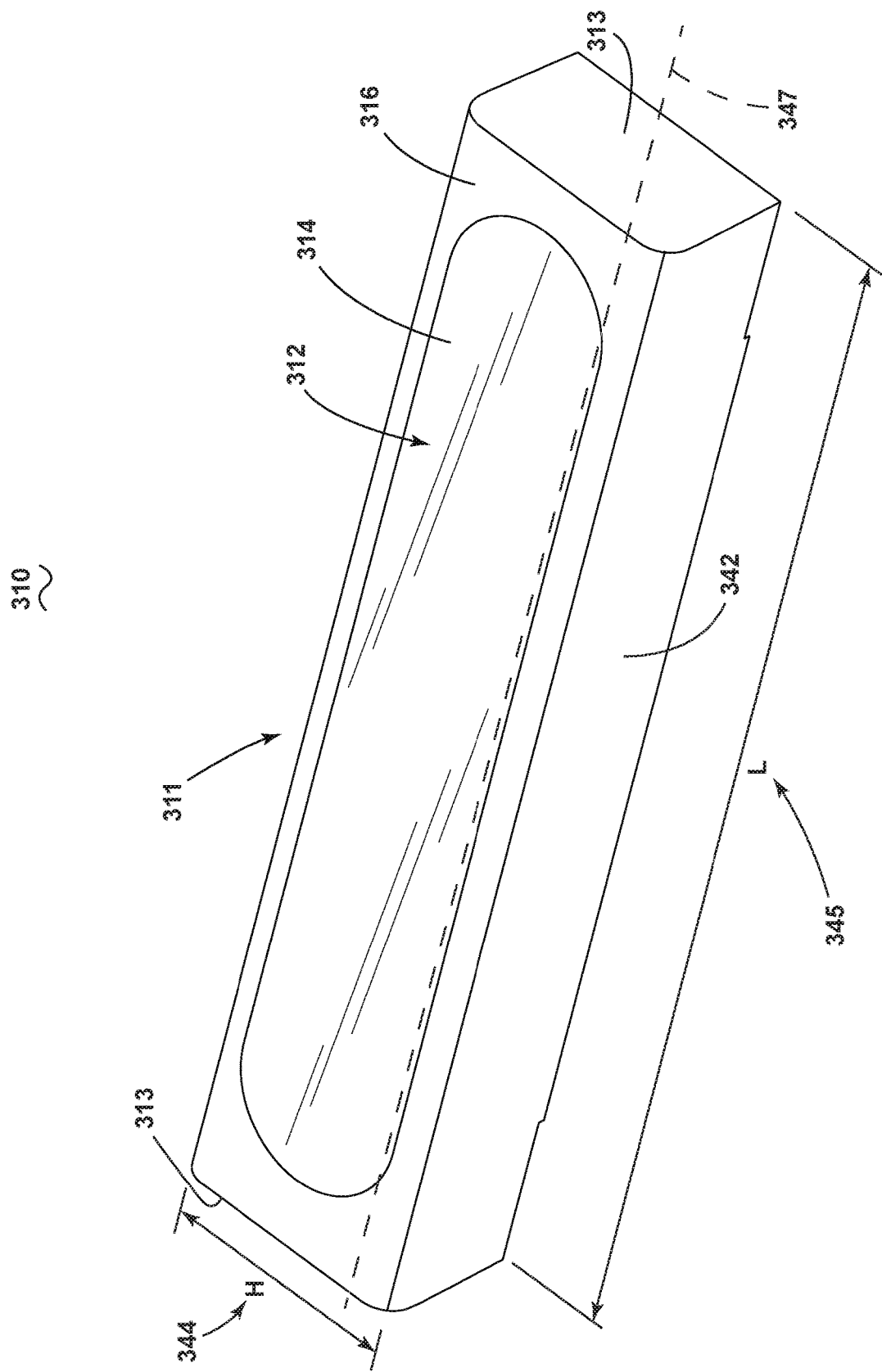
FIG. 11 illustrates a perspective view of the supplemental lighting element of FIG. 10, in accordance with various aspects described herein.

FIG. 11 illustrates a perspective view of a single supplemental lighting element 310. The supplemental lighting element 310 can include a housing 311 that can include an optical element 312 having opposing axial ends 313. The optical element 312 can be formed of a flexible and translucent or transparent material that can be molded, such as an optical grade silicon. The optical element 312 can further include a first flexible silicon molding 314 and a second flexible silicon molding 316 positioned about the periphery of the first flexible silicon molding 314. The second flexible silicon molding 316 can include the opposing axial ends 313 and can be formed by over-molding the first flexible silicon molding 314. It is contemplated that the second flexible silicon molding 316 can be formed with an opaque material, rather than a translucent or transparent material.

The housing 311 can also include peripheral walls 342 of the second flexible silicon molding 316 that can be coupled with the opposing axial ends 313 and can generally extend along a longitudinal axis 347 or major body axis of the supplemental lighting element 310. The longitudinal axis 347 can be defined by a circuit board (not shown) located within the supplemental lighting element 310, where the longitudinal axis 347 can be perpendicular to and in between the opposing axial ends 313. A length 345 ("L" in the figure) can extend parallel with the longitudinal axis 347 and define a set or predetermined length of the housing 311. In one non-limiting aspect of the disclosure, the length 345 can be approximately 161.7 millimeters (6.3 inches). Furthermore, a height 344 or minor body axis of the supplemental lighting element 310 can be measured perpendicular to the longitudinal axis 347 and can be about 1.1 inches, or 27.94 millimeters. In one non-limiting example, each of the axial ends 313 can be formed or configured to correspond with or match an adjacent axial end 313 of an adjacent supplemental lighting element 310. While substantially flat or planar axial ends 313 are shown, additional axial end 313 configurations can be included in aspects of the disclosure.

Figure 12:
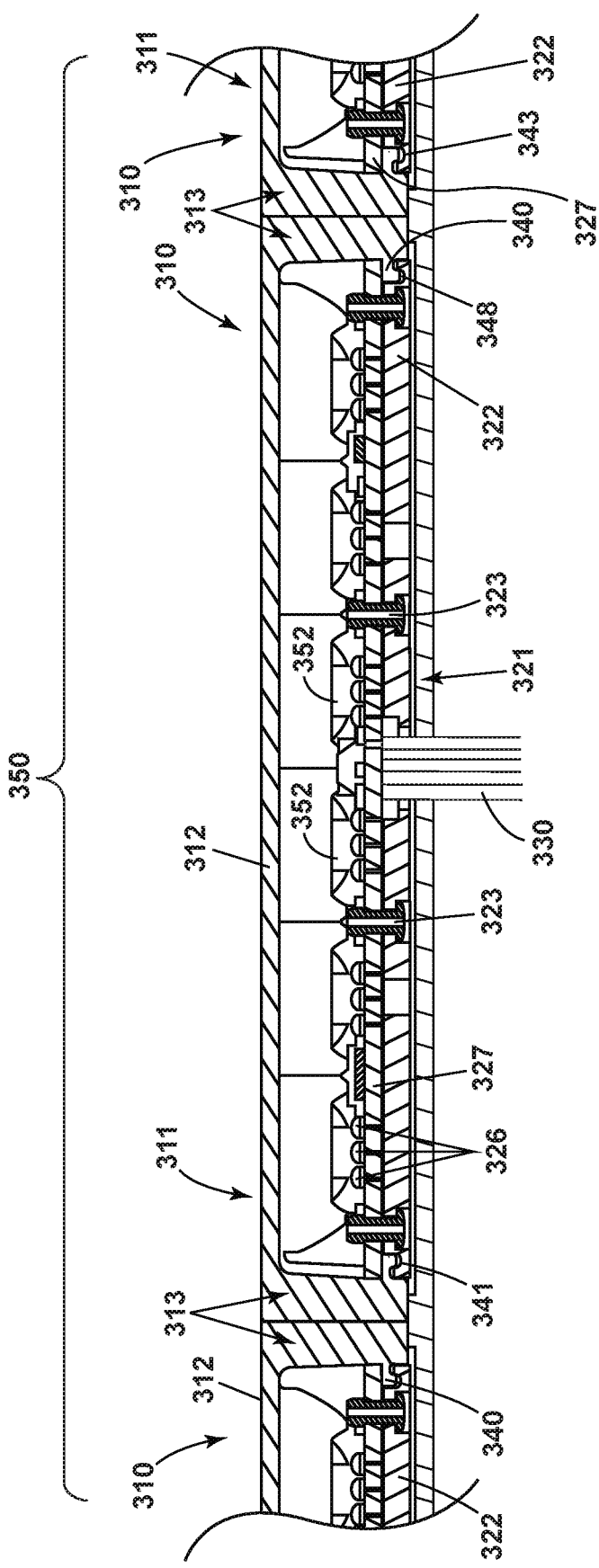
FIG. 12 illustrates a cross-sectional view of the supplemental lighting element, taken along line XII-XII of FIG. 10, in accordance with various aspects described herein.

FIG. 12 illustrates a cross-sectional view of the supplemental lighting element 310, taken along line XII-XII of FIG. 10. A circuit board 327 within the housing 311 can include at least one illuminator 326 in register with optical element 312 where the first flexible silicon molding 314 can be positioned in the optical path of the illuminator 326. The illuminator can be contained within a cavity 352 and can include a set of light-emitting diodes (LEDs). It is contemplated that the supplemental lighting element 310 includes a sensor configured to sense an environmental state proximate to the supplemental lighting element 310 such that the supplemental lighting element 310 can operate in response to the environmental state. For example, the illuminator 326 can be configured to auto-dim such that the illuminator 326 reduces output power during darker operating conditions sensed by the sensor. Environmental states can include but are not limited to: ambient light, strobing or pulsating light, temperature, and current drawing in order to determine an installed or not installed state.

The peripheral wall 342 of the optical element 312 can envelope a periphery of the circuit board 327. A heat sink 322 can be disposed below the circuit board 327, and a thermal pad 380 can be disposed between the circuit board 327 and the heat sink 322. When the optical element 312 is positioned, or placed, around the circuit board 327, a gap 348 can be formed between the heat sink 322 and the circuit board 327. The housing 311 can include at least one inwardly-extending leg 340 on the peripheral wall 342 that can be positioned between the opposing circuit board 327 and the heat sink 322. A retainer 341 on the inwardly-extending leg 340 can be located within a recess 343 in alignment with the inwardly-extending leg 340 on the heat sink 322.

FIG. 12 more clearly shows the continuous exterior surface 350 formed by adjacent supplemental lighting elements 310. A fastener 323 can pass through at least one of the circuit board 327 or heat sink 322 to attach the circuit board 327 with the heat sink 322 or, attach the supplemental lighting element 310 to a mounting surface 321. When the fastener 323 passes through the circuit board 327 or the heat sink 322, a compressive force from the fastener 323 forces the circuit board 327 toward the heat sink 322, which can close the gap 348 between the circuit board 327 and the heat sink 322 and form a weather-tight seal. Furthermore, when the fastener is mounted to a mounting surface 321, a compressive force from the fastener can force the peripheral wall 342 of the housing 311 toward the mounting surface 321 to form a weather-tight seal between the supplemental lighting element 310 and the mounting surface 321. In addition to forming a weather-tight seal between the supplemental lighting element 310 and the mounting surface 321, the supplemental lighting element 310 can form a weather-tight seal between adjacent lighting elements 310. A set of electrical connectors, shown as conductive wires 330, can electrically couple the circuit board 327, or the illuminator 26 to a power source.

Since the supplemental lighting elements 310 can form weather-tight seals where the circuit board 327 and other electronics are contained within the interior of the housing 311, each supplemental lighting element 310 can be addressed to execute commands from a central controller rather than each supplemental lighting element 310 having their own controller. The centralized controller can be in the form of a remote such that the controller is not required to be located on the vehicle light bar 300.

The opposing axial ends 313 of the supplemental lighting element 310 are configured to be in alignment and match, or conform to an adjacent opposing axial end 313 of an adjacent supplemental lighting element 310. Since the adjacent opposing axial ends 313 of adjacent supplemental lighting elements 310 are configured to match, the adjacent optical elements 312 can form the continuous exterior surface 350 of the supplemental lighting elements.

Figure 13:
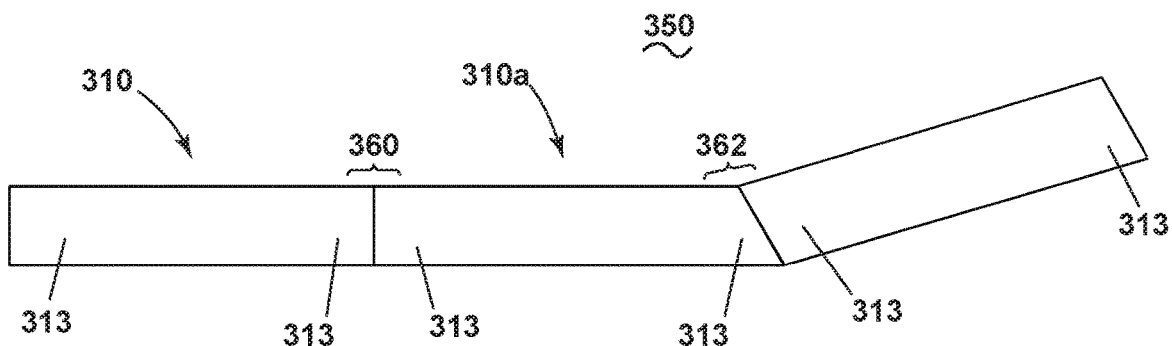
FIG. 13 illustrates an exemplary top-down view of a continuous exterior surface of a set of the supplemental lighting elements, in accordance with various aspects described herein.
Figure 14:
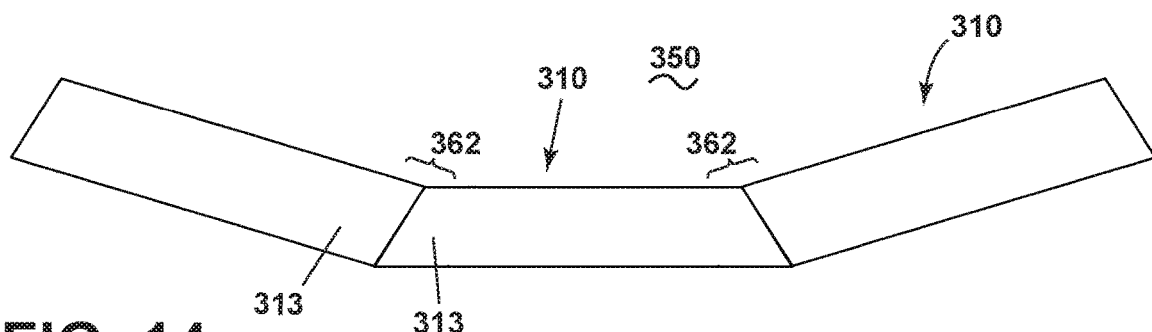
FIG. 14 illustrates another exemplary top-down view of a continuous exterior surface of a set of the supplemental lighting elements, in accordance with various aspects described herein.
Figure 15:
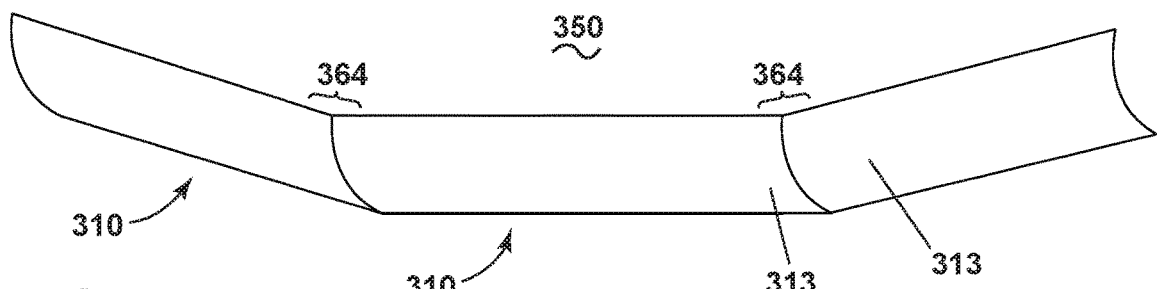
FIG. 15 illustrates yet another exemplary top-down view of a continuous exterior surface of a set of the supplemental lighting elements, in accordance with various aspects described herein.

Turning to FIG. 13, an exemplary continuous exterior surface 350 is illustrated where adjacent opposing axial ends 313 of supplemental lighting elements 310 can form a butt joint alignment 360 or a mitered joint alignment 362 such that the butt joint alignment 360 forms a straight edge and the mitered joint alignment 362 forms an angular edge. In one non-limiting example, the joint alignment 360, 362 can be selected to match or correspond with the underlying mounting surface 321 (not shown) Non-limiting examples can be included wherein, for example, a supplemental lighting element 310a can include dissimilar opposing axial ends 313 such that the alignment for the opposing axial ends 313 are different configurations. FIG. 14 illustrates another example of the continuous exterior surface 350 where two mitered joint alignments 362 are shown in successive adjacent opposing axial ends 313 such that the continuous exterior surface 350 has two successive angular edges. FIG. 15 illustrates yet another continuous exterior surface 350 having radial joint alignments 364. The radial joint alignments 364 can provide for an angular or curving edge that is more round that an edge formed by mitered joint alignments 362. Additional curvatures, curve radii, and the like can be included in aspects of the disclosure.

Figure 16:
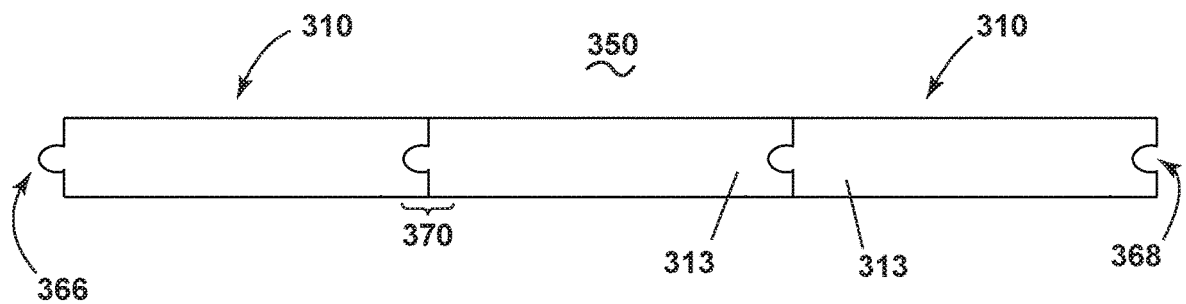
FIG. 16 illustrates yet another exemplary top-down view of a continuous exterior surface of a set of the supplemental lighting elements, in accordance with various aspects described herein.

Turning now to FIG. 16, yet another exemplary continuous exterior surface 350 is illustrated where adjacent opposing axial ends 313 of the supplemental lighting elements 310 can form a mechanical interlock 370. The mechanical interlock 370 can be formed where a first axial end 313 defines a key element 366 and a second, adjacent axial end 313 defines a keyway 368. The key element 366 and the keyway 368 are configured to be any suitable complementary shapes such that the key element 366 and the keyway 368 can mechanically interlock. For example, the key element 366 can include a projection while the keyway 338 can include a complementary recess in order for the projection to tightly fit within the recess.

The continuous exterior surface 350 can be formed by any combination adjacent axial end 313 alignments including, but not limited to a combination of butt joint alignments 360, mitered joint alignments 362, radial joint alignments 364, mechanical interlocks 370, or the like, where each supplemental lighting element 310 can include similar or dissimilar alignments of opposing axial ends 313.

Many other possible embodiments and configurations in addition to that shown in the above figures are contemplated by the present disclosure. For example, one non-limiting aspect of the disclosure can be included wherein an additional sealing element, such as a flexible material, adhesive, sealant, or the like, can be received into or proximate to at least one of the retainer 41 or the recess 43, between the peripheral wall 42 and a mounting surface 62, or between adjacent axial ends 313, to provide or improve the weather-proof seal described herein.

The embodiments disclosed herein provide a vehicle lighting assembly. One advantage that can be realized in the above embodiments is that the above-described aspects have superior size and durability advantages over conventional lighting fixtures. The flexible silicon optical elements provide for improved durability, or are more resistant to chips, cracks, or dulling, compared with similarly configured and sized polycarbonate type lens. The aforementioned configurations further provide for a thermally coupled heat sink that can be further connected with a vehicle mounting surface, further enabling increased heat removal or cooling capabilities compared with conventional configurations. Yet another advantage of the above-described aspects is that the lighting element assembly includes no sharp edges, allowing the lighting element assembly to meet state, local, or federal guidelines relating to smooth outer surface requirements.

Yet another advantage of the described assembly is that the optical elements allow for selective doping, tinting, or coloring of the housing to provide reduced visibility, or increased concealment of the assembly, compared with conventional lighting elements. Reduced visibility, or increased concealment can result in more effective vehicle utilization, such as for law enforcement. Reduced visibility or increased concealment is further enabled by a lower overall height of the lighting element assembly, as described. Yet another advantage of the described assembly is that the mounting of the lighting element assembly can provide for at least one weather-tight seal, preventing moisture or debris from entering the assembly, or interfering with the electronics such as the circuit board or LEDs. The interference of weather can increase maintenance efforts, or prematurely reduce the expected operating life of the assembly or subcomponents.

Yet another advantage of the described assembly is that the assembly allows for or enables a set of multi-colored LEDs to be included, as well as conformity of controlling operations for the multi-colored LEDs. By enabling multi-colored, controllable LEDs, a single lighting element assembly can effectively function as a set of different, single-colored lighting assemblies. Yet another advantage of the described assembly is that the assembly allows for or enables the molding of the housing or optical elements into shapes not otherwise possible with traditional engineering thermoplastics. Another advantage is the integrated single piece 12 with short optical profile height of the full assembly relative to the mounting surface 62.

Yet another advantage of the described supplemental lighting elements allows for more customization of a vehicle lighting element as various alignments of opposing axial ends enable the size and shape of the vehicle lighting element to vary. Thus, a vehicle lighting element can include an array of linear and nonlinear portions of the continuous exterior surface. Mechanical interlocking alignments can also provide for optimal interlocking engagement of adjacent supplemental lighting elements. Moreover, the flexible silicon material of the supplemental lighting elements allows the part to be molded such that the alignments can be effectively formed. The flexible silicon material also allows for superior impact and chipping resistance compared to conventional thermoplastic lenses, as well as resistance to yellowing over time.

Yet another advantage of the described supplemental lighting elements allows for formation of weather-tight seals between the circuit board and the heat sink, as well as between the housing and the mounting surface. The weather-tight seals can protect against water, salt, or other contaminants from entering the interior of the supplemental lighting element or between the supplemental lighting element and the mounting surface. Furthermore, the weather-tight seals of the supplemental lighting element allow the electronics to be entirely contained within the housing such that there is no need for an electronic control PCB or other electronic to be sealed internal the vehicle light bar frame. Thus, the vehicle light bar can be configured in a uniquely thin design. The thin profile of the vehicle light bar can reduce aerodynamic drag, part weight, attachment complexity, as well as conspicuity.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A lighting element comprising:
   a circuit board defining a longitudinal axis and having a periphery edge, and including at least one illuminator;
   a housing having a first flexible element and a second flexible element, the at least one of the first flexible element and the second flexible element defining opposing axial ends, the first flexible element defining an optical pathway for the at least one illuminator, and the second flexible element aligned with a periphery edge of the circuit board; and
   wherein the opposing axial ends are configured to match an axial end of an adjacent lighting element.

2. The lighting element of claim 1, wherein the first flexible element is transparent.

3. The lighting element of claim 2, wherein the second flexible element is at least partially opaque.

4. The lighting element of claim 1, wherein at least one of the first flexible element or the second flexible element comprises at least one of a silicon material or a silicone material.

5. The lighting element of claim 1, wherein the housing defines a minor body axis perpendicular to the longitudinal axis of the circuit board, and wherein the minor body axis is less than or equal to 27.94 millimeters wide.

6. A lightbar assembly, comprising a set of lighting elements of claim 1 adjacently arranged along axial ends of at least a subset of the lighting elements.

7. The lightbar assembly of claim 6, wherein each of the set of lighting elements are adjacently arranged with another of the set of lighting elements along respective axial ends.

\* \* \* \* \*